Figure 1:
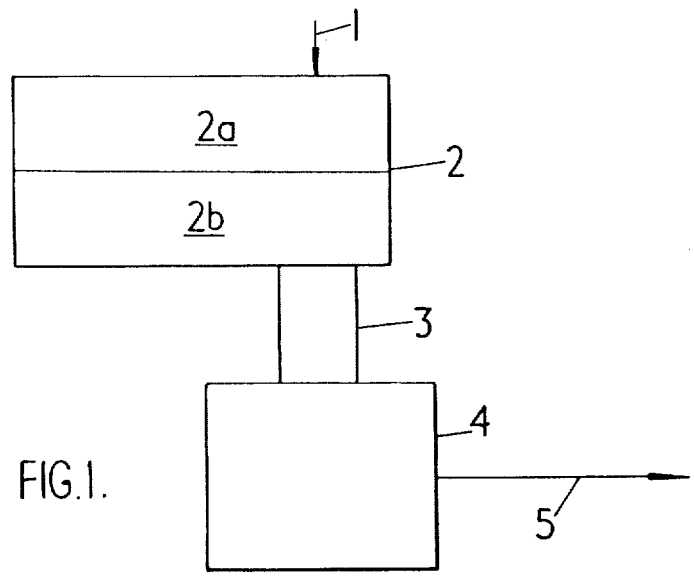

United States Patent [19]
Starkie

[11] 3,888,167
[45] June 10, 1975

[54] HEAT TREATMENT OF PARTICULATE SOLID MATERIALS IN CONTINUOUS FLOW

[75] Inventor: Granville Lewis Starkie, Crawley, England

[73] Assignee: The A.P.V. Company Limited, Crawley, Sussex, England

[22] Filed: Sept. 5, 1973

[21] Appl. No.: 394,495

[52] U.S. Cl.............. 99/467; 99/355; 99/443 C; 99/477; 198/110
[51] Int. Cl............................................. A23l 3/18
[58] Field of Search............ 99/467, 352, 355–356, 99/452, 461, 470, 477, 443; 53/55, 59; 141/255, 256–257; 198/64, 110, 213; 222/55, 56

[56] References Cited
UNITED STATES PATENTS

| | | | |
|---|---|---|---|
| 827,049 | 7/1906 | Vraalstad | 198/110 |
| 2,679,344 | 5/1954 | Nordean | 141/255 |
| 2,805,639 | 9/1957 | Martin | 99/470 X |
| 3,297,204 | 1/1967 | Adamson | 222/55 |
| 3,532,387 | 10/1970 | Stancari | 53/59 R UX |
| 3,680,280 | 8/1972 | Stancari | 53/59 R |

Primary Examiner—Harvey C. Hornsby
Assistant Examiner—Arthur O. Henderson
Attorney, Agent, or Firm—Christel & Bean

[57] ABSTRACT

The invention provides a holding zone at a low temperature for particulate solid materials in a heat treatment plant which has to shut down temporarily because of breakdown or other stoppage of a subsequent process step, such as aseptic filling. According to the invention there is provided a reversible transfer conveyor situated downstream of the cooling section and upstream of the connection to the receiving plant, the said transfer conveyor being associated with a temporary retention zone at least equal in capacity to the hot zone whereby on stoppage of the receiving plant the conveyor may be reversed to feed treated and cooled material into the temporary retention zone until the hot zone has been cleared, and on recommencement of normal drive to the conveyor, the material in the temporary retention zone will be fed on to the connection to the receiving plant.

5 Claims, 2 Drawing Figures

HEAT TREATMENT OF PARTICULATE SOLID MATERIALS IN CONTINUOUS FLOW

This invention relates to the heat treatment of particulate solid materials, e.g. food products such as meat cubes, beans and so forth, in continuous flow.

The invention is particularly intended for use in connection with sterilization processes and will be particularly described in relation to sterilization, but it will be appreciated that it is also applicable to heat treatments which do not involve sterilization. For instance, it is also applicable to the continuous cooking of foodstuffs without a sterile filling step, and to enzyme inactivation and blanching, which operate at somewhat lower temperatures.

The sterilization may be carried out by a short time exposure to high temperature, and the product flow line may lead directly to a sterile packing system, such as a sterile canning plant.

In a through-flow, high temperature, short time sterilization process for particulate solids where the sterilizing plant is directly connected to feed an aseptic filling and sealing system (e.g. into cans), a severe problem arises if a breakdown of the filling and sealing arrangements occurs. If the product cannot be diverted into an alternative receiving system it must either be recycled to a plant feed or the sterilizing plant shut down. Shutting down and restarting is a lengthy procedure, and recycling is undesirable as it leads to over-processing of some product. Diverting to an alternative receiver involves considerable expense and, when dealing with solid particles, poses difficult handling problems.

Certain types of continuous flow processing plant are not dependent on the feed stream to push the product ahead of it. Plant of this type operates with a mechanical means, or gravity, and will hereinafter be referred to as positive displacement plant. It will be appreciated that such plant is self-clearing of product.

According to the present invention, there is provided a heat treatment plant of the positive displacement type for the treatment, such as sterilization, of particulate solid material in continuous flow and connected, or adapted to be connected, to a receiving plant, such as an aseptic filling and sealing unit, comprising a hot zone in which the material is heated to the required temperature and a cooling section in which the treated material is reduced to a temperature at which it can be held without significant damage, and a reversible transfer conveyor situated downstream of the cooling section and upstream of the connection to the receiving plant, the said transfer conveyor being associated with a temporary retention zone at least equal in capacity to the hot zone whereby on stoppage of the receiving plant the conveyor may be reversed to feed treated and cooled material into the temporary retention zone until the hot zone has been cleared, and on recommencement of normal drive to the conveyor, the material in the temporary retention zone will be fed on to the connection to the receiving plant.

This invention thus solves the problem of temporary shut-down in a positive displacement plant in a way which avoids the need for an alternative receiver, and does not overprocess any product. The plant is simply stopped in accordance with a preset programme at any time the product receiving system is unable to take product, and is in a condition to be restarted again at any time as soon as product can be handled by the receiving system. An important feature is that the plant can be left in the dormant state virtually indefinitely without causing significant damage to the product or loss of sterility in the already sterilized product.

Figure 2:
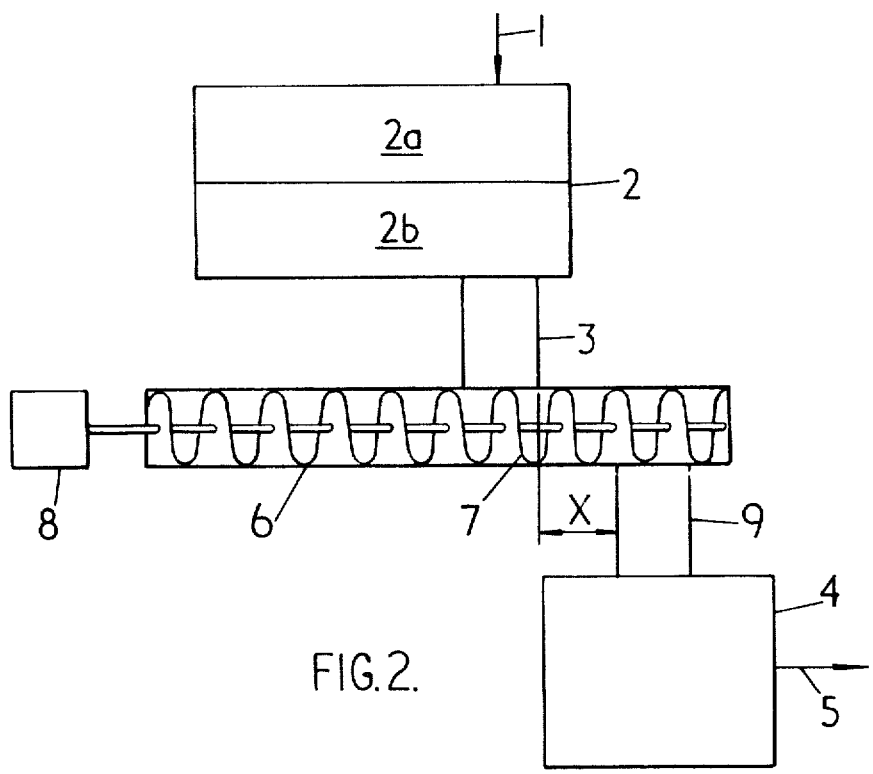

The invention will be further described with reference to the accompanying drawing in which drawing:

FIG. 1 is a simple flow diagram of an existing type of sterilizing and packing plant; and FIG. 2 is a similar diagram of a sterilization plant in accordance with a preferred form of the invention, in conjunction with a packing plant.

Referring to FIG. 1, feed material enters at 1 a sterilizing and cooling unit 2, which essentially comprises at least the hot zone 2a and cooling section 2b referred to, and passes via a duct 3 to a packing system 4, such as an aseptic canning plant, from which it emerges at 5.

If such a system were mechanically stopped whilst maintaining operating temperature and pressure conditions throughout, the product within the hot zone 2a of sterilizing unit 2 would become rapidly overprocessed and spoiled; that in the cooling section 2b would be cooled to a safe temperature for holding. In such a process the average temperature in the hot zone 2a of sterilizer unit 2 would normally be in excess of 121°C (250°F) and that in the cooling section 2b below 50°C (122°F).

FIG. 2 is a schematic arrangement of a form of plant modified according to the invention. It will be seen that a transfer conveyor has been interposed between the sterilizing unit 2 and the packing system 4. The transfer conveyor comprises a cylinder barrel 6 in which rotates a close fitting, reversible, helical screw conveyor 7 driven by a suitable drive unit 8. The unit is hermetically sealed and operated normally under positive pressure and under sterile conditions at a low temperature comparable to that at the outlet of the cooling section 2b in the sterilizing unit 2. Under normal conditions of forward flow the screw 7 is rotated to transfer product from duct 3 to a duct 9 and thence to the packing system 4. The distance 'X,' which is the minimum distance traversed by the product within the transfer conveyor, is equal to at least one full pitch of the helical screw 7 and preferably not more than two full pitches. It is to be noted that the screw is not shown to scale in the drawing.

Should a stoppage occur at the packing system 4, demanding that product is no longer fed forward, the main consideration is to remove all material from the hot zone 2a within the sterilising unit 2. This is achieved by the following operations which occur simultaneously:

1. The supply of product to the unit 2 is stopped and the inlet sealed e.g. by a suitable valve;

2. Simultaneously the product inlet to the packing system 4 is shut off (e.g. by a suitable valve) thus isolating the sterilizing unit and the transfer conveyor from the packing system; and 3. The screw 7 in the transfer conveyor is reversed and run at the same speed in the reverse direction.

Product is thus transferred into the 'dead end' of barrel 6, which constitutes a temporary retention zone, over a preset time period which ensures that all product is removed from the hot zone 2a in the sterilizer 2 and now resides either in the low temperature section 2b in the sterilizing unit 2 or in the transfer barrel 6. The effective capacity of the dead end of barrel 6 is arranged to be equal to at least that of the hot zone 2a in the sterilizing unit 2 and as soon as sufficient time has elapsed for this hot zone 2a to be cleared of product the drive unit 8 is stopped and forward flow within the sterilizing unit 2 arrested.

The plant is now in its dormant state, the product contained within being confined to low temperature zones (e.g. less than 50°C for most foodstuffs) where heat damage will be negligible.

Normal processing temperatures and pressures may be maintained in the various zones of the sterilizer 2 during this period, which from the product quality point of view can last virtually indefinitely.

When forward flow to the packing system 4 is again required, the following events occur:

1. Feed is admitted through the inlet 1 to the sterilizing unit 2;
2. The product inlet to the packing system 4 is opened;
3. The drive 8 is started in the 'forward' direction so that product begins to be transferred through duct 9 to the packing system 4;
4. Normal forward flow conditions are resumed in the hot zone 2a of sterilizing unit 2. At this time there is no transfer through the cooling section 2b of sterilising unit 2.
5. After an appropriate lapse of time which allows the hot zone 2a of sterilizer 2 just to become filled with product and also allows the dead end of transfer barrel 6 to become empty, transfer of product through the cooling section 2b of sterilizer 2 is resumed.

It will be seen that as a result of correctly sizing the transfer barrel 6 and accurately phasing the start-up and shut-down of the various plant sections when forward flow is resumed the dead end of barrel 6 will just become cleared of product when product begins to emerge from the cooling section 2b of sterilizer 2 into the transfer barrel 6. Thus a steady forward flow out of the plant is resumed and maintained from the moment of reverting to forward flow.

It is preferable for all the operations required for such a product stoppage and restart to be carried out automatically.

Various modifications are possible, e.g. the transfer conveyor could comprise a belt unit running in a hermetically sealed cylinder; also the transfer conveyor need not necessarily be in the position shown. It could, for instance, be within the steriliser unit 2.

I claim:

1. In a heat treatment plant of the positive displacement type for the treatment, such as sterilization, of particulate solid material in continuous flow and having a connection connected or connectable to a receiving plant such as an aseptic filling and sealing unit, the heat treatment plant comprising a hot zone in which the material is heated to the required treatment temperature and a cooling section in which the material is reduced to a temperature at which it can be held without significant damage: a reversible transfer conveyor situated downstream of the cooling section and upstream of the connection to the receiving plant, said conveyor having an input in communication with said cooling section and an output in communication with the connection to the receiving plant, said conveyor input and output being spaced apart a distance sufficient to insure that all material entering said conveyor input is first transported by said conveyor before entering said conveyor output, means defining a temporary retention zone at least equal in capacity to the hot zone, said retention zone being operatively associated with said conveyor, said conveyor normally transferring material from the cooling section to the connection to the receiving plant and whereby on stoppage of the receiving plant the conveyor may be reversed to feed treated and cooled material into the temporary retention zone until the hot zone has been cleared, and on recommencement of normal drive to the conveyor, the material in the temporary retention zone will be fed on to the connection to the receiving plant.

2. Heat treatment plant as claimed in claim 1, in which the transfer conveyor comprises a cylinder barrel and a screw conveyor closely filling in the cylinder barrel.

3. Heat treatment plant as claimed in claim 2, in which the cylinder barrel has an inlet and an outlet which are spaced apart by between one and two pitches of the screw conveyor.

4. Heat treatment as claimed in claim 2, in which the cylinder barrel has an extension forming the temporary retention zone into which the processed material is carried when the conveyor is reversed.

5. Heat treatment plant as claimed in claim 1, further including first valve means for stopping the flow of said material to said hot zone, second valve means in the connection to the receiving plant for isolating the receiving plant from said conveyor and the hot zone and cooling section, and control means for closing said first and second valve means and reversing said conveyor.

* * * * *